United States Patent [19]

Allread et al.

[11] Patent Number: 4,643,216
[45] Date of Patent: Feb. 17, 1987

[54] FRANGIBLE BALL VALVE CONNECTOR

[75] Inventors: Alan R. Allread; William C. Marrison, both of Jackson; Russell L. Rogers, Munith; Alexander P. Webster, Concord, all of Mich.

[73] Assignee: Aeroquip Corporation, Jackson, Mich.

[21] Appl. No.: 826,621

[22] Filed: Feb. 6, 1986

[51] Int. Cl.[4] .............................................. F16K 17/14
[52] U.S. Cl. ........................ 137/68.1; 137/614.02; 251/287; 251/313; 285/2
[58] Field of Search ............ 137/68.1; 285/1, 2; 251/287, 313

[56] References Cited

U.S. PATENT DOCUMENTS 4,262,691  4/1981  Kacal .......................... 251/287 X
4,328,822  5/1982  Wilhelm ........................ 137/68.1
4,376,445  3/1983  Meisenheimer ............... 251/313 X Primary Examiner—Harold W. Weakley
Attorney, Agent, or Firm—Beaman & Beaman

[57] ABSTRACT

A ball valve connector of the frangible crashworthy type wherein two fluid flow connector body halves are interconnected by fracturable elements. Each body half includes a ball valve within a flow passage pivotally mounted on diametrically located pins. The pivot pins and valves are capable of displacement in the axial direction of fluid flow to compensate for manufacturing tolerances and provide maximum sealing characteristics. Each valve is rotatable 90° between open and closed positions, and a stop projection defined on each valve cooperates with a spring biased stop ring providing positive retention of the valve in the closed position.

17 Claims, 6 Drawing Figures

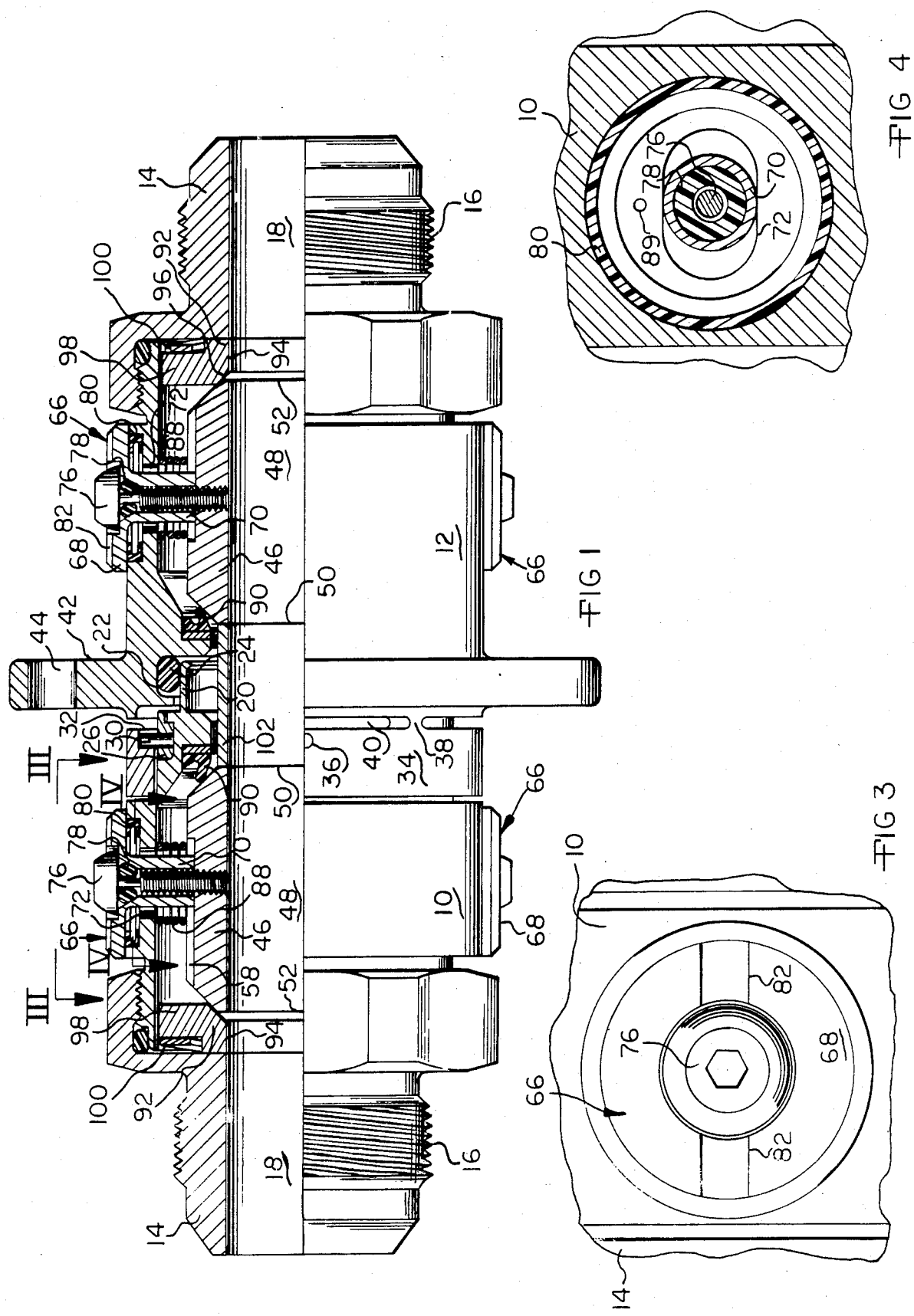

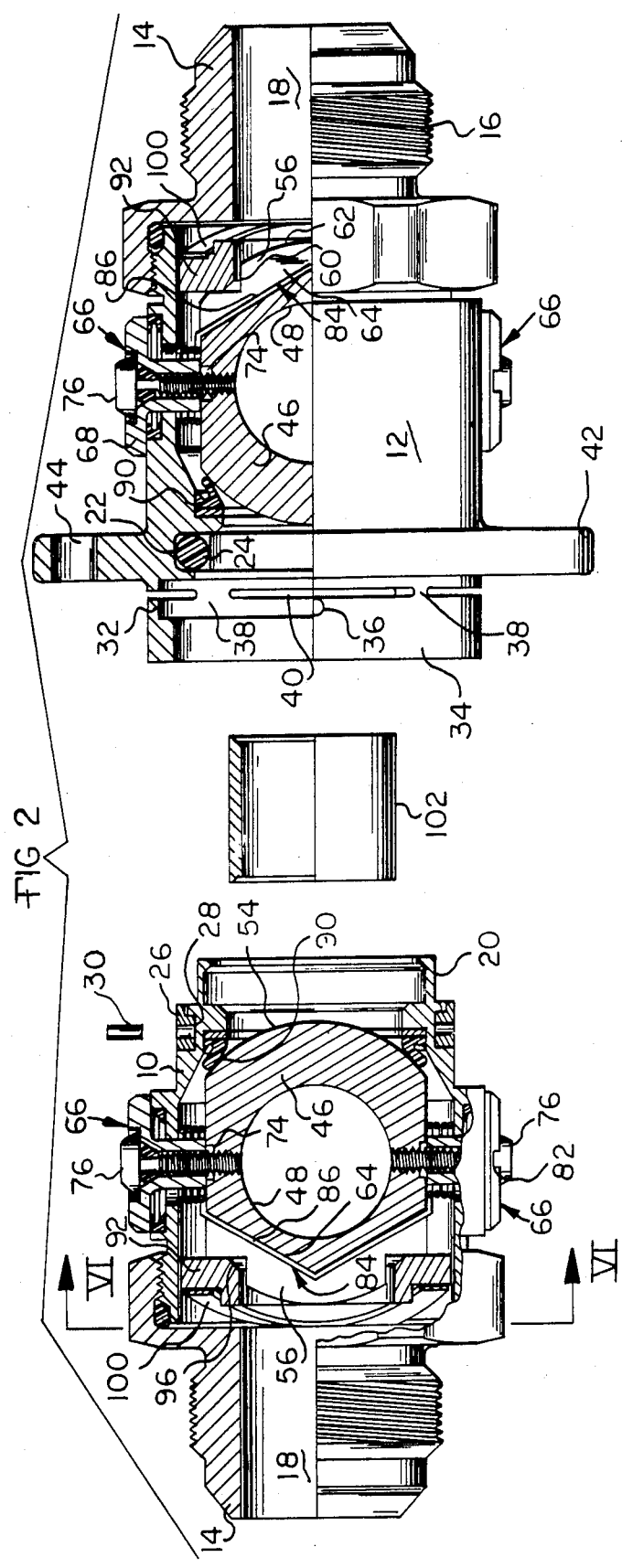
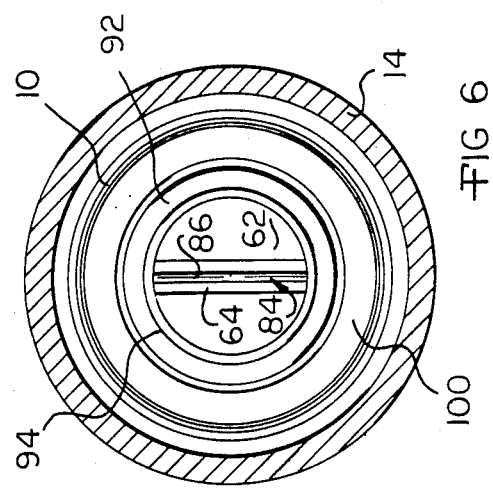
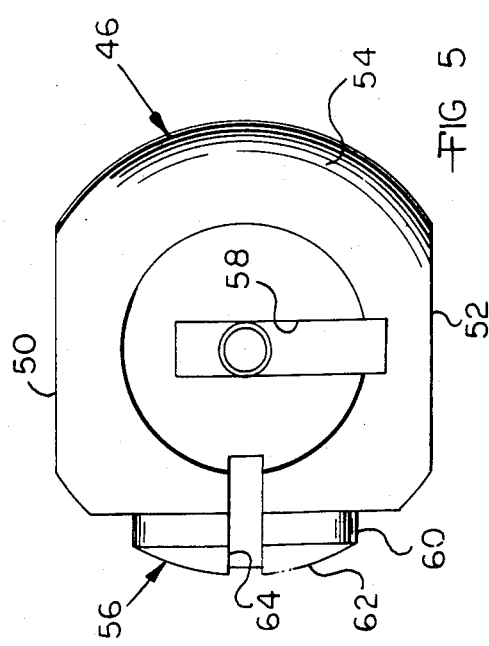

FRANGIBLE BALL VALVE CONNECTOR

BACKGROUND OF THE INVENTION

Crashworthy fluid flow connectors are used in aircraft to interconnect the aircraft fuel tanks with fuel lines. Such connectors consist of two interconnected body parts or halves each having an automatically operated valve capable of closing the connector half to fluid flow upon the connector halves being disconnected. The connector halves are interconnected by frangible elements, usually shear pins and weakened ribs or webs, and in the event of a crash, bending or tension forces imposed upon the connector bodies fracture the frangible elements permitting the bodies to separate and the valves close minimizing fluid loss and spillage, and significantly reducing fire hazards.

It is most important that crashworthy fluid flow connectors, particularly those used in aircraft fuel systems, be dependable in operation, relatively concise in configuration and weight, and produce minimum restriction to fluid flow therethrough. Crashworthy connectors presently available have not met all of these criteria.

It is an object of the invention to provide a crashworthy fluid flow connector consisting of two body parts interconnected by frangible elements wherein the connector is of a concise configuration, relatively lightweight, and produces no restriction to fluid flow therethrough.

Another object of the invention is to provide a crashworthy fluid flow connector employing frangible elements interconnecting body parts wherein each body includes a valve of the ball type rotatable upon a pivot axis between fully open and closed positions, and where a positive and foolproof stop system maintains the valves in the closed position upon the valves being automatically actuated due to fracturing of the frangible elements.

Yet another object of the invention is to provide a crashworthy fluid flow connector utilizing frangible elements to interconnect body parts wherein each body part includes a ball type valve automatically positionable from an open position to a closed position upon release of retaining structure holding the valves in the open position, and wherein the valves are so supported within their associated body as to compensate for manufacturing tolerances, and wherein maximum sealing of the ball valves with their associated body is achieved upon separation of the connector parts.

In the practice of the invention a pair of substantially similar body parts or halves are interconnected by frangible elements such as shear pins and webs. Each body part includes an end, usually threaded, to which a fluid conduit may be connected, and the other end of the body constitutes a connection end at which the body parts are interconnected by the frangible elements. Each part includes an axial flow passage in which is mounted a ball type valve having a diametrical bore and pivotally supported upon diametrically located pivot pins. The valve bore is of a diameter substantially equal to that of the conduits with which the connector is used, and a sleeve or tube is inserted between the valves such that when the body parts are connected in the operative condition the sleeve will maintain the valves in the fully open position. The sleeve also includes a bore equal in diameter to that of the valves, and none of the flow paths of the components of the connector is of such a diameter as to reduce the fluid flow area with respect to that of the associated conduits.

A single torsion spring is used with each ball valve to rotate the valve from the open to the closed position and the spring has a central region which externally extends over a portion of the valve and each end of the spring is coiled to define a torsion spring portion circumscribing one of the valve pivot pins. The torsion spring portions are wound in opposite directions and by using a single spring to define both torsion springs employed to impose a rotative force on the valve the possibility of incorrect assembly of the spring is eliminated. The spring torsion ends impose a rotative force on the valve about the pivot pin axis biasing the valve toward a closed position wherein the valve bore is perpendicularly related to the associated body flow passage.

A stop projection of cylindrical configuration is defined on the "side" of each valve, and the stop projection is received within a stop ring located within the associated body part flow passage when the valve has rotated about its pivot axis to the fully closed position wherein the valve bore is perpendicular to the body flow passage. The stop ring includes a cylindrical bore having a conical countersunk end, and an annular spring in the form of a wave washer axially biases the stop ring toward the associated valve wherein the stop ring will engage the valve in both its open and closed positions. When the valve is rotated to the fully closed position the valve's stop projection is received within the stop ring bore providing a positive abutment terminating valve rotation and retaining the valve in the closed position.

To accommodate manufacturing tolerances, and also improve sealing conditions between the valves and associated connector body part, the pivot pins supporting each ball valve are mounted in the associated body part for transverse axial displacement, to a limited extent, in the direction of the connector fluid flow passage. This "floating" mounting of the pivot pins is achieved by locating the pivot pins in slots within the associated body part and seals interposed between the pivot pin structure and the body part renders the assembly fluid-tight.

An annular seal is located within the flow passage of each body part adjacent the connection end, and this seal is of the lip type and engages the associated valve sealing the valve with respect to the connection end of the body. The spring axially biasing the stop ring into engagement with the associated valve also biases the valve in the axial direction toward the engaged seal, and the torsion spring portions associated with each valve spring are so designed as to impose an axial force on the valve toward its seal. This axial force on the valves is countered by the valve retaining sleeve interposed between the two valves, and due to the "floating" assembly of the valves within their associated body part manufacturing tolerances do not adversely affect the ability of the retaining sleeve to maintain the valves in their fully opened positions. However, upon separation of the body parts due to fracture of the frangible elements, the axial force imposed upon the valves by the stop ring and valve springs will force the valves into firmer engagement with their associated annular lip seal to improve the sealing between the valve and associated body while the valve is in the closed position.

The use of the valve projection and the stop ring provides a positive stop to the rotation of the valves from the open to the closed positions, and the "floating"

support of the valves reduces frictional forces between the valves and their associated seal during valve rotation, yet permits effective sealing to prevent fluid loss through the separated connector body parts. The parts can be readily machined to concise configurations and no flap valves or poppet valve structure is employed which would restrict fluid flow through the connector. The use of the ball valves and retaining sleeve provide a "straight through" flow path free of restrictions and pressure loss.

BRIEF DESCRIPTION OF THE DRAWINGS

The aforementioned objects and advantages of the invention will be appreciated from the following description and accompanying drawings wherein:

FIG. 1 is an elevational view, the upper half being sectioned, illustrating a frangible fluid flow connection in accord with the invention as fully coupled and in operative condition, FIG. 2 is an exploded, elevational view, partially in section, illustrating the primary components in a separated condition and the valves shown in the closed position, FIG. 3 is an enlarged, plan, detail view of pivot pin structure taken along Section III—III of FIG. 1, FIG. 4 is a plan, sectional view through pivot pin structure as taken along Section IV—IV of FIG. 1, FIG. 5 is a top, plan view of a valve, per se, and FIG. 6 is an elevational, sectional view as taken along Section VI—VI of FIG. 2.

DESCRIPTION OF THE PREFERRED EMBODIMENT

A fluid flow connector embodying the aspects of the invention consists of two primary components, a male body part or half 10, and a female body part or half 12. Many of the components associated with each part are identical, and identical components are indicated by like references numerals.

Each body part has a fluid conduit connecting end defined by an adapter 14 which is threadedly affixed and sealed to the associated connector body. Each adapter includes threads 16 and a chamfered end for receiving a standard hose fitting, not shown, and the adapters include bores 18 which define a flow path equal to the diameter of the hose or conduit with which they are associated.

The male body 10 includes an axial cylindrical extension 20 which is received within the recess 22 defined in the female part 12, and the bodies are sealed in connected relationship by O-ring 24, FIG. 1. These interconnected ends of the bodies 10 and 12 constitute the bodies' connection ends and the seal ring 24 insures that the bodies are interconnected in a fluid-tight relationship. The interconnection between the body parts 10 and 12 is produced by frangible elements, which in the disclosed embodiment, include a ring 26 mounted within a groove 28 formed in body 10, and the ring 26 includes three radially extending holes for receiving shear pins 30 received within a groove 32 formed in the annular frangible extension 34 defined on the connection end of the body 12. The ring 26 can be rotated within its groove 28 and the shear pins 30 are inserted into the annular groove 32 and the holes in ring 26 through hole 36, formed in the frangible extension 34. The extension 34 is connected to the primary portion of the female body part 12 by a plurality of webs 38 of restricted area defined between a plurality of circumferential slots 40. A mounting flange for the connector is defined on the female body at 42 and includes holes 44 whereby the connector may be mounted in an aircraft bulkhead, and a conduit, not shown, connected to a fuel tank is associated with one of the body adapters 14, while a fuel line to the engine, not shown, is connected to the other body adapter.

A ball valve 46 is located within each connector body, and the ball valves, and associated pivot pin and stop structure of each body part are identical.

The ball valves 46 each include a diametrical bore 48 of a diameter equal to that of the adapter bores 18, and the valves are machined in planes at right angle to the axis of the associated bore to form flat terminating ends 50 and 52, FIG. 5. The external surface 54 of the valves is spherical, although as previously described, the surfaces 50 and 52 are machined thereon, and the valves are also machined flat at their top and bottom as viewed in FIGS. 1 and 2. Further, as later described, one "side" of the ball valves is machined with a stop projection 56.

On opposite sides, at the upper and lower flat surfaces FIGS. 1 and 2, the valves are provided with linear notches 58, FIG. 5, which are parallel to the associated valve bore 48, in which the pivot pin structure is associated, as later described. Also, one "side" of the valves is machined to form the cylindrical surface 60 defining the stop projection 56 which has an axis 90° to the axis of the associated valve bore 48. The outer surface 62 of the stop projection is of the spherical configuration of the valve, and a notch 64 is defined in the external surface of the valve extending from the upper valve flat to the lower flat, and extending through the stop projection 56, as will be appreciated from the male body representation of FIG. 2.

Pivot pin structure is associated with the upper and lower regions of the valves as represented in FIGS. 1 and 2. Such pivot pin structure includes a pin 66 having a head 68 located exteriorly of the associated body part and a stem 70 extending through body slots 72. The innermost end of the pins 66 is provided with parallel flats 74, FIG. 2, which are closely received within the valve notches 58. Thus, rotation of the valves 46 also rotates the pins 66. A screw 76 extends through the pin 66 and is threadedly connected to the valve. Two screws 76 and two pins 66 are associated with each valve 46 located on diametrically opposed sides thereof and tightening of the screws assembles the pins within the notches 58 permitting the pins and screws to define a diametrical pivot axis for the valves. A seal ring 78 seals the screw 72 to the pin 66, and an annular lip seal 80 located within a recess in the associated body part seals the pin head 68 with respect to the body part.

The pin head 68 includes a diametrical indicia notch 82, FIG. 3, which is parallel to the pin flats 74, and will indicate to the operator the position of the associated valve. When the valves 46 are in the open position shown in FIG. 1, the notches 82 will be parallel to the axial length of the connector indicating to the operator that the connector valves 46 are both open and the connector is in the operative condition.

A rotative biasing force is imposed upon each valve 46 about its pivot axis to automatically pivot the valves from the open position to the closed position in the event of separation of the parts 10 and 12. Preferably, this biasing force is produced by a spring 84 having a central region 86 received within the valve notch 64, as best illustrated in FIG. 2. Each end region of the spring 84 is wound with a torsion coil 88, and the coils extend about the pivot pin stem 70, the free ends of the spring coils being received within a hole 89 formed in the associated body, adjacent the slots 72, FIG. 3. The location of the spring ends and holes 89 is such that the coils 88 each impose an axial force on the associated valve 46 in a direction toward the valve retainer sleeve, and as later described, this biasing force augments the biasing force imposed on the valves by valve stop structure. By utilizing a single spring 84 with each valve having torsion coils 88 wound upon the ends thereof in opposite directions, the possibility of erroneously assembling the torsion springs to the valve structure is eliminated, as could occur if two separate torsion springs were used with each valve.

Elastic lip seals 90 of an annular configuration are located within the body parts 10 and 12 adjacent the connection ends thereof, and the lips of the seals 90 engage the exterior spherical surface 54 of the associated valve 46 as appreciated from both FIGS. 1 and 2.

An annular stop ring 92 is located within each body part intermediate its adapter 14 and associated valve 46. The stop rings 92 are of an annular configuration having a cylindrical bore 94 of a diameter substantially equal to the diameter of the adapters bores 18 and valve bores 48, and are concentric thereto. Also, the bore of the stop ring is chamfered at 96 and will engage the surface of the valve as indicated in the drawings. The stop rings 92 include a radial shoulder against which an annular spring 100 in the form of a wave washer engages. The spring 100 bears against the stop ring shoulder and the adjacent adapter imposing an axial force on the stop ring toward the associated valve 46 maintaining the stop ring in engagement with the valve at all times.

The valves 46 are maintained in their open position by a cylindrical retaining sleeve 102 having ends which are configured to closely conform to the ends 50 of the valves. As the ends of the sleeve firmly engage the valve ends 50 throughout the circumference of the valve bores 48, the sleeve will prevent the valves 46 from rotating when the body parts are connected as shown in FIG. 1. The inner diameter of the sleeve 102 corresponds to the diameter of the valve bores 48 and adapter bores 18, and as will be appreciated from FIG. 1, the assembled connector has no restrictions to flow therethrough.

The connector is assembled as shown in FIG. 1. The male body extension 20 is received within the female recess 22 and sealed thereto by O-ring 24. Shear pins 30 are sequentially inserted through hole 36 into the ring 26 as the ring is rotated to align with three shear pin ring holes with the hole 36 and the shear pins' location in groove 32 will maintain the illustrated assembly of the body parts 10 and 12. Prior to this assembly the retainer sleeve 102 is located between the valves 46, and the open position of the valves 46 can be checked by observing the indicia notches 82 defined on the pivot pin heads 68.

The length of the elongated body slots 72 is greater than the diameter of the pivot pin stem 70, as will be appreciated from FIGS. 1 and 4, and with an accurately dimensional sleeve 102 and valves 46, the stems 70 will be located substantially central of the associated slot 72 as shown in FIG. 4. However, as the manufacturing tolerance dimensions of the sleeve length and valve ends 50 may vary between their high and low limits, the use of the enlarged slots 72 will accommodate such tolerances, and, in effect, the valves 46 axially "float" with respect to the associated body part.

As illustrated in FIG. 1, the stop rings 92 will be engaging the adjacent valve 46 adjacent end 52 and the wave springs 100 will be imposing an axial force on the valves 46 to maintain abutting engagement of the valve ends 50 with the ends of the retaining sleeve 102. Likewise, the axial forces imposed upon the valves by the torsion coils 88 will axially bias the valves 46 toward the sleeve 102, further assuring the proper relationship between the sleeve and valves in the full open position. The lips of seals 90 will be engaging the valves 46, and the degree of engagement between the valves and lip seals 90 is determined by the length of the retaining sleeve 102.

In the event of a crash or severe impact, the forces imposed on the body parts 10 and 12 will either shear the pins 30, or fracture the webs 38, permitting the body parts to separate. Tension forces primarily shear the pins, while bending movement fractures the webs. This separation is augmented by the axial forces imposed on the valves 46 by the springs 100 and torsion spring coils 88, and as the body parts separate, the retaining sleeve 102 will be released and no longer restrain the valves 46 against rotation about their pivot axes due to the torque forces imposed on the valves by the torsion coils 88. Release of the retainer sleeve 102 causes the valves 46 to very quickly rotate about their pivot axes 90° which permits the stop projections 56 to align with the bores 94 of the stop rings 92, FIGS. 2 and 6, and the alignment of the stop rings with the stop projections 56 is aided by the chamfered surface 96. The stop rings are axially displaced by springs 100 receiving surface 56 into bore 94 and as the stop rings are closely received within the associated body parts 10 and 12, the reception of the stop projections 56 within the stop rings prevents further rotation of the valves 46 about their pivot axes, and the valve bore 48 is now located at right angles to the adapter bores 18, and each body part is sealed with respect to fluid flow therethrough, FIG. 2.

The removal of the retainer sleeve 102 permits the valves 46 to be axially displaced the maximum extent toward the associated body connector end as the pivot pin stems 70 are forced against the inner end of the slots 72, FIG. 2. This axial displacement of the valves is due to the influence of the wave springs 100 and the torsion coils 88, and will firmly force the closed valves against its associated lip seal 90 producing greater compression on the lip seal than previously existed. However, it is to be noted that the "floating" mounting of the valves 46 within its body part will reduce the frictional engagement of the lip seal 90 with its valve 46 during the initial rotation of the valve prior to the retainer sleeve being fully displaced, and this reduction in frictional forces on the valve as it rotates aids in the speed and dependability of the valve operation.

From the above description it will be appreciated that the aforementioned objects and advantages have been achieved. The reception of the valve stop projection 56 within the stop ring 92 provides a positive positioning of the valve in the closed condition, and the floating support of the valves 46 within the body parts accommodates variations in manufacturing tolerances, and a fluid flow connector in accord with the invention is free of flow restrictions and pressure loss.

It is appreciated that various modifications to the inventive concepts may be apparent to those skilled in the art without departing from the spirit and scope of the invention.

We claim:

1. A frangible fluid flow connector comprising, in combination, first and second tubular bodies each having an axis, an axial flow passage, a fluid conduit connecting end and a body connection end, frangible means interconnecting said bodies at said connection ends in coaxial relationship, an annular ball valve located within each body flow passage having a bore coaxially alignable with the associated body passage at an open position and perpendicularly disposed to the associated body passage at a closed position, pivot means located on said bodies pivotally supporting said valves for rotation between said open and closed positions about axes perpendicular to the associated body axis, valve retaining means retaining said valves in said open position when said bodies are interconnected and releasing said valves for movement to said closed position upon fracture of said frangible means, first spring means connected to said ball valves biasing said valves about said pivot means toward said closed position, an exterior surface defined on said valves, a projection defined on said valves' exterior surface disposed at substantially 90° to the length of said valves' bores, a stop ring mounted in each body axially intermediate the body fluid conduit connecting end and the associated valve concentrically disposed to the associated body flow passage and retained therein, a bore defined in said stop ring adapted to receive said valve projection when the adjacent valve is in said closed position, and second spring means biasing said stop ring toward the adjacent valve to receive said valve projection.

2. In a frangible fluid flow connector as in claim 1, said valves' projection comprising a cylindrical surface, and said stop ring bore including a cylindrical surface closely receiving said projection cylindrical surface.

3. In a frangible fluid flow connector as in claim 1, said valves' projection comprising a cylindrical surface having an axis substantially perpendicular to the length of the bore of the associated valve, said stop ring bore including a cylindrical surface closely receiving said projection and a conical counterbore disposed toward the adjacent valve.

4. In a frangible fluid flow connector as in claim 1, said second spring means comprising an annular wave washer interposed between the associated body and stop ring.

5. In a frangible fluid flow connector as in claim 1, said first spring means comprising a double wound torsion spring, said torsion spring including a central region and first and second ends, oppositely wound coils defined at said spring first and second ends, said pivot means comprising pivot pins diametrically located on opposite sides of said valves, a coil circumscribing a pivot pin of a common valve, said spring central region exteriorly disposed with respect to the associated valve.

6. In a frangible fluid flow connector as in claim 5, said valves' each having an exterior surface having a groove defined therein extending between the associated pivot pins, said first spring central region being received within said groove.

7. In a frangible fluid flow connector as in claim 1, said retaining means comprising a tubular member having ends, each tubular member end abuttingly engaging a valve to maintain the valves' bore in alignment and said valves in said open position.

8. A frangible fluid flow connector comprising, in combination, first and second tubular bodies each having an axis, an axial flow passage, a fluid conduit connecting end and a body connection end, frangible means interconnecting said bodies at said connection ends in coaxial relationship, an annular ball valve located within each body flow passage having a bore coaxially alignable with the associated body passage at an open position and perpendicularly disposed to the associated body passage at a closed position, pivot means located on said bodies pivotally supporting said valves for rotation between said open and closed positions about axes perpendicular to the associated body axis, valve retaining means retaining said valves in said open position when said bodies are interconnected and releasing said valves for movement to said closed position upon fracture of said frangible means, first spring means connected to said ball valves biasing said valves upon said pivot means toward said closed position, an exterior surface defined on said valves, an annular seal concentrically mounted within the flow passage of each body adjacent the body connection end thereof, first stop means defined on said valves' exterior surface, second stop means defined on said bodies adapted to cooperate with said first stop means to retain said valves at said closed position, means supporting said pivot means on said bodies for movement of said pivot means and valves in the axial direction of said bodies' flow passages, and second spring means within each body axially biasing the associated valve toward the associated body connection end and a sealed relationship with the associated annular seal.

9. In a frangible fluid flow connector as in claim 8, said pivot means supporting said valves comprising pivot pins diametrically associated with a valve on opposite sides thereof, and said means supporting said pivot means comprising openings defined in said bodies receiving said pivot pins and of a larger dimension in the axial direction of said bodies' flow passages than said pivot pins permitting movement of said pivot pins therein in the axial direction of said flow passages.

10. In a frangible fluid flow connector as in claim 9, sealing means interposed between said pivot pins and the associated body sealing said pins with respect to the associated opening.

11. In a frangible fluid flow connector as in claim 8, said first stop means comprising a projection defined on said valves' exterior surface disposed at substantially 90° to the length of said valves' bores, said second stop means comprising a stop ring mounted in each body axially intermediate the body fluid conduit connecting end and the associated valve concentrically disposed to the associated body flow passage and retained therein, a bore defined in said stop ring adapted to receive said valve projection when the adjacent valve is in said closed position, said second spring means biasing said stop ring into engagement with the associated valve.

12. In a frangible fluid flow connector as in claim 11, said valves' projection comprising a cylindrical surface, and said stop ring bore including a cylindrical surface closely receiving said projection.

13. In a frangible fluid flow connector as in claim 12, said valves' projection comprising a cylindrical surface having an axis substantially perpendicular to the length of the bore of the associated valve, said stop ring bore including a cylindrical surface closely receiving said projection and a conical counterbore disposed toward the adjacent valve.

14. In a frangible fluid flow connector as in claim 13, said second spring means comprising an annular wave washer interposed between the associated body and stop ring.

15. In a frangible fluid flow connector as in claim 14, said first spring means comprising a double wound torsion spring, said torsion spring including a central region and first and second ends, oppositely wound coils defined at said spring first and second ends, said pivot means comprising pivot pins diametrically located on opposite sides of said valves, a coil circumscribing a pivot pin of a common valve, said spring central region extending exteriorly of the associated valve.

16. In a frangible fluid flow connector as in claim 15, said valves each having an exterior surface having a groove defined therein extending between the associated pivot pins, said first spring central region being received within said groove.

17. In a frangible fluid flow connector as in claim 16, said retaining means comprising a tubular member having ends, each tubular member end abuttingly engaging a valve to maintain the valves' bore in alignment and said valves in said open position.

* * * * *